United States Patent [19]

Sato et al.

[11] Patent Number: 4,567,326

[45] Date of Patent: Jan. 28, 1986

[54] TELEPHONE APPARATUS FOR SELECTIVE OPERATION IN A NORMAL AND REPERTORY DIAL MODE

[75] Inventors: Yasuji Sato; Takao Yamamoto; Yoshikazu Sano, all of Tokyo, Japan; Yasunobu Nakayama, Tustin, Calif.

[73] Assignee: Tokyo Shibaura Denki Kabushiki Kaisha, Kawasaki, Japan

[21] Appl. No.: 378,729

[22] Filed: May 17, 1982

[30] Foreign Application Priority Data

May 28, 1981 [JP] Japan ................................ 56-80099

[51] Int. Cl.⁴ .......................................... H04M 1/274
[52] U.S. Cl. ............................... 179/90 B; 179/90 BD
[58] Field of Search ........... 179/90 BD, 90 BB, 90 B, 179/18 B, 18 BA, 90 K

[56] References Cited

U.S. PATENT DOCUMENTS 4,053,718 10/1977 Derveaux ..................... 179/90 B
4,243,845 1/1981 Feinberg et al. .......... 179/90 BD X

FOREIGN PATENT DOCUMENTS 1288917 9/1972 United Kingdom .
1320896 6/1973 United Kingdom .
1345328 1/1974 United Kingdom .
1461978 1/1977 United Kingdom .

*Primary Examiner*—Stafford D. Schreyer
*Attorney, Agent, or Firm*—Cushman, Darby and Cushman

[57] ABSTRACT

A telephone apparatus having the standard ten digit keys and two special keys, and in the handset the conventional switchhook. By manual operation of the two special keys and the switchhook the apparatus can be operated in any one of a plurality of modes, at least some causing transmission of stored sequences of digits in response to entry of an abbreviated address or in causing redialing. In one mode data signals are produced and transmitted in response to not only the digit keys but also the special keys as well. A controller operates the apparatus and is connected to a dial sender which converts the data signals into a multi-frequency signal which is transmitted by a telephone network to a repeater station.

11 Claims, 3 Drawing Figures

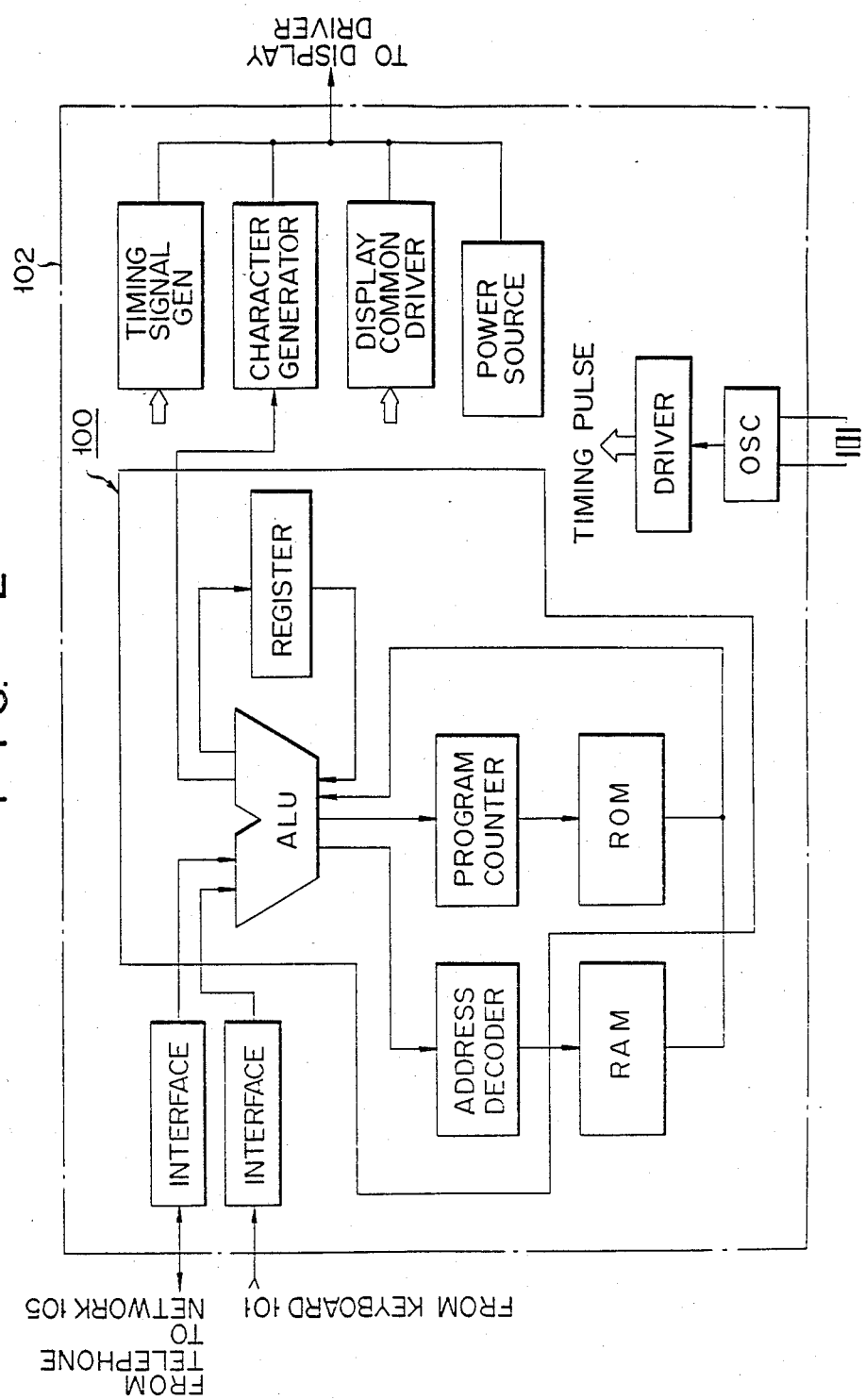

TELEPHONE APPARATUS FOR SELECTIVE OPERATION IN A NORMAL AND REPERTORY DIAL MODE

BACKGROUND OF THE INVENTION

This invention relates to telephone apparatus of the touch tone dial type and, more particularly, to telephone apparatus which can execute a plurality of functions without increasing the number of dial keys.

With prior art telephone apparatus, an abbreviated dialling function or re-dial function can be obtained by using a "*" Key or "#" key among the keys provided on the usual keyboard as an abbreviated dialing key thereby providing an abbreviated dialling key or a re-dial key on the keyboard. For example, by operating two number keys after operating a "*" key, a telephone number, which has been stored in a memory in advance, is read out and sent to a repeater station. Also, by operating a "#" key, a telephone number keyed in advance is read out from the memory and sent out to the repeater station. However, in order to provide for various additional functions beyond the abbreviated dialling and re-dialling mentioned above, it is necessary to add new keys to the existing keys on the keyboard. In addition, in using the existing "*" and "#" keys as special keys, although these keys can provide an instruction for reading out data stored in memory, the instruction itself is not sent out as a manual dial signal to the repeater station. Therefore, although it would have been possible to add various functions to the telephone apparatus if signals produced by operating the "*" and "#" keys were sent out as manual dial data, this could not have been realized with the prior art apparatus. Furthermore, the prior art telephone apparatus produces a dual tone multifrequency signal when the asterisk "*" key or the number "#" key is operated.

Further, there is another function which has hitherto been desired, namely effecting a plurality of successive abbreviated dialling operations. For example, it may be desired to make a phone call from a point A in New York City, N.Y. to a point B in California. In such a case, if there is a company E which possesses an exclusive telephone line betweeen a point C in New York City and a point D in California, it is convenient for the telephone subscriber at point A to conclude a contract with the company E for use of the exclusive line. If this is realized, the subscriber at point A can directly obtain communication with the called party at point B without need of waiting despite any state of congestion of communication. In this case, it is necessary for the subscriber (caller) at point A to dial first the telephone number of the company E at point C, then the telephone number of the company at point D and then the telephone number of the called party at point B in California. To dial a plurality of telephone numbers in succession in the above way is considerably troublesome. In such a case, it would be convenient if the dialing could be completed by merely depressing an abbreviated dialling key several times. However, even where the "*" key is used as an abbreviated dialling key in the prior art, the function of sending out a plurality of telephone numbers in succession by operating this key several times has not been provided.

SUMMARY OF THE INVENTION

The present invention is intended to solve the above problem, and has for its object to provide a telephone apparatus, with which a number of additional functions are realized by making use of the existing keys on the keyboard.

In the present invention the telephone keyboard has the standard ten digit keys and two special keys, and the telephone handset has associated with it a conventional switch hook. By manual operation of the two special keys and the switch hook, the apparatus can be operated in any one of a plurality of modes, at least some modes causing transmission of stored sequences of digits in response to entry of an abbreviated address, or causing transmission of a previously dialed number in response to a redialing mode. In one mode data signals are produced and transmitted in response to not only the digit keys but also the special keys as well. A controller operates the apparatus and is connected to a dial sender which converts the data signals into a multi-frequency signal for transmission by a telephone network to a repeater station.

BRIEF DESCRIPTION OF THE DRAWINGS

FIG. 2 is a circuit showing one preferred embodiment of a controller as shown in FIG. 1.

DETAILED DESCRIPTION OF THE PREFERRED EMBODIMENT

Now, an embodiment of the invention will be described with reference to the drawings.

Figure 1:
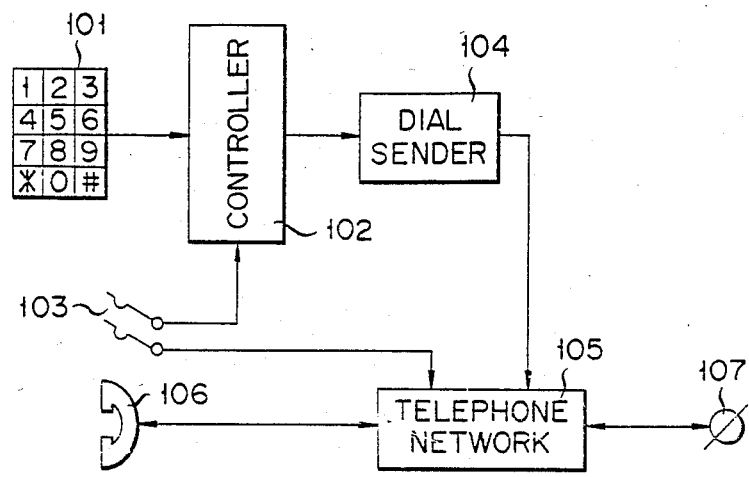
FIG. 1 is a block circuit diagram showing one embodiment of the telephone apparatus according to the invention.

As shown in FIG. 1, the telephone apparatus according to the invention includes a keyboard 101, which has 10 numeral keys for numerals "0" to "9", and a "*" key and a "#" key as special keys. A controller 102 is connected to the keyboard 101, and code data can be sent out by operating the aforementioned keys (numeral or special) in a predetermined sequence as manual dial mode data. The controller 102 is a one-chip unit including a well-known electronic calculator CPU 100 as shown in FIG. 2 as a main element; for instance Memonote T6027 (a trade name) may be used for the controller 102.

The code data sent out from the controller 102 is coupled to a dial sender 104 and converted therein into a tone signal as a multi-frequency signal (FM signal) which is fed to a telephone network 105. The telephone network 105 is also connected to a hook switch 103 for mode switching to the controller 102 and is also connected to a handset 106. The telephone network 105 is further connected to a terminal 107. Network 105 receives the multifrequency signal as a tone signal from the dial sender 104 mentioned above and a voice signal from the handset 106 and sends out a signal through the terminal 107 to a repeater station.

The dial sender 104 and telephone network 105 may be well-known networks, for instance as disclosed in "Telecommunication Data Book" (Mostek Corporation, issued March 1981,) page IV-2, FIG. 2 and page IV-6, FIG. 10.

Figure 3:
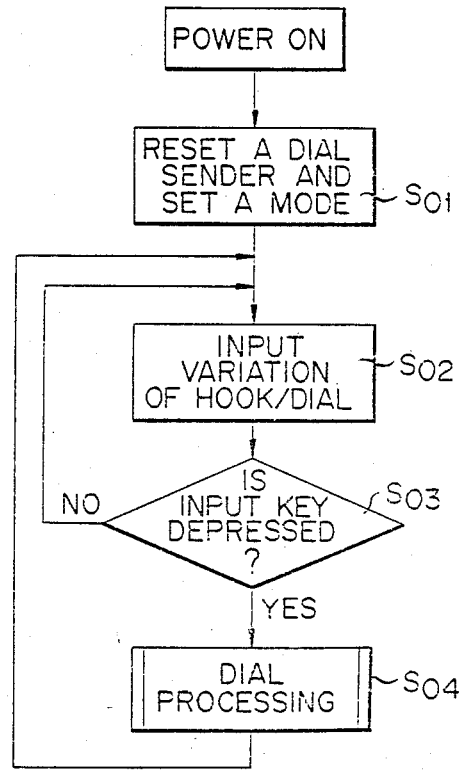
FIG. 3 is a flow chart for explaining the operation of the telephone apparatus shown in FIG. 1.

In the circuitry described above, the controller 102 executes a program as shown in the flow chart of FIG. 3. When the telephone apparatus is rendered operative with power furnished thereto, the controller 102 first executes a step S01, in which it supplies an output for resetting the dial sender 104. The controller 102 receives an output signal which is determined by either an "on" or an "off" state of the hook switch (corresponding to whether the handset of the telephone apparatus) is in the "off-the-hook" state or in the "on-the-hook" state in the initial power "on" state. Controller 102 is set in a setting ready mode A when the hook switch 103 is in the "on" state and, it is set in a dial input ready mode E when the hook switch 103 is in the "off" state. The program then proceeds to a step S02, in which the controller 102 can receive a signal produced by key operation in the keyboard 101 or a signal produced by a switching of the hook switch 103, and then in a step S03 the controller 102 checks whether there has been an input. If there has been no input and the check yields a decision "NO", the program returns to the step S02. If there has been an input so that the check in the step S03 yields a "YES", the program proceeds to a step S04, in which a dial input processing is effected. When the step S04 is ended, the program returns to the step S02 of monitoring an input of signal due to key operation in the keyboard 101 or switching of the hook switch 103.

Specific examples of execution of the flow chart will now be described with reference to a Decision Table shown below. In the Decision Table, the hook switch is in the on state (corresponding to the telephone apparatus handset being in the "off-the-hook" state) in the modes A to D, and the hook switch is in the off state (corresponding to the telephone apparatus handset being in the "on-the-hook" state) in the modes E to G. The Decision Table sets forth the relation between the setting mode, corresponding to a variation of input state, and the processing or the variation of the mode.

relevant telephone number as the abbreviated dial number in a memory in the controller 102 in advance. The setting of the abbreviated dial number is as follows. The hook switch 103 is set to the "on" hook state (or the telephone apparatus handset is in the "off-the-hook" state) and the "#" key as one of the special keys is depressed. With reference to the Decision Table, when the "#" key is depressed in the setting ready mode A, the controller 102 is set to a mode B0 in a process (5). The mode B0 is an abbreviation * ready mode. When the "*" key is subsequently depressed, the mode is switched to a mode B1 in a process (9). The mode B1 is an abbreviation address ready mode. Then, a numeral data "10" is keyed in as a designation signal for specifying a predetermined address of a memory in the controller 102 corresponding to the abbreviated dial number. When the first numeral "1" of the data "10" is keyed in, the mode is switched to a mode B2 in a process (13). The mode B2 is again the abbreviation address ready mode. Then, a telephone number which is desired to be abbreviated, for instance "0425 83 1111", is keyed in. If the memory capacity of the controller 102 is 16 digits, any telephone number of 16 or less digits may be stored without any problem. However, if the keyed-in telephone number data exceeds 16 digits, the mode is changed to a mode D in a process (23). This mode is an over-digit mode, and any further numeral data coupled by operating keys in this mode is made ineffective in a process (28). When the setting of the abbreviated dial is ended, the "#" key is depressed, whereby the mode A is brought about again in a process (25).

When setting the abbreviated dial number as described above, for instance setting "0425 83 1111" as an

Decision Table

| HOOK-STATE | Mode | | Hook operation | | Dial operation | | |
|---|---|---|---|---|---|---|---|
| | | | Off-hook | On-hook | 0 9 | * | # |
| ON STATE | Setting ready | A | Mode E (1) | (2) | Ineffective (3) | Ineffective (4) | Mode B0 (5) |
| | abbreviation ready | B0 | Interrupt setting, mode E (6) | (7) | Ineffective (8) | Mode B1 (9) | Mode A (10) |
| | abbreviation address ready | B1 | ↓ (11) | (12) | Address setting, mode B2 (13) | Ineffective (14) | ↓ (15) |
| | abbreviation address ready | B2 | ↓ (16) | (17) | Address setting, mode C (18) | ↓ (19) | ↓ (20) |
| | Setting input ready | C | ↓ (21) | (22) | Mode D if digits are over, input setting (23) | ↓ (24) | Complete setting, mode A (25) |
| | Over-digit | D | ↓ (26) | (27) | Ineffective (28) | ↓ (29) | ↓ (30) |
| OFF STATE | Input ready | E | | Mode A (32) | Dial send-out mode F0 (33) | Mode F1 (34) | Re-dial send-out mode F0 (35) |
| | | | (31) | | | | |
| | abbreviation* ready | F0 | | Dial stop mode A (37) | Dial send-out (38) | Mode F1 (39) | Ineffective (40) |
| | | | (36) | | | | |
| | abbreviation address ready | F1 | | ↓ (42) | Address setting mode F2 (43) | Ineffective (44) | Mode G (45) |
| | | | (41) | | | | |
| | abbreviation address ready | F2 | | ↓ (47) | abbreviated-dial sent-out with address obtained, mode F0 (48) | Mode F1 (49) | Mode F0 (50) |
| | | | (46) | | | | |
| | Manual dial | G | | ↓ (52) | Dial sent-out (53) | Dial sent-out (54) | Dial sent-out (55) |
| | | | (51) | | | | |

In the table, "/" indicates that there is no pertinent mode, and "↓" indicates that the pertinent process or mode is the same as that in the row immediately above.

First, sending out an abbreviated dial number will be described. In this case, it is necessary to have stored the abbreviated dial number "10" data "#*100425831111#" may be keyed in.

While in the above description the numeral value of the telephone number has been keyed in during the setting input ready mode C, it is impossible to store an instruction signal coupled by operating the "*" or "#" key in the memory of the controller 102 at this time. This is so because if the "*" key is depressed, it is made ineffective in process (24) in the Decision Table, while the depression of the "#" key is not memorized but is treated as the completion of setting so that the mode is switched to the initial mode A. Further, when the "#" key is depressed in the abbreviation * ready mode Bo by switching of the mode, mode A is brought about in a process (10). Further, whenever the hook switch 103 is switched from the "on" state to the "off" state (corresponding to the telephone apparatus handset being in an "on-the-hook" state) a mode E, which is an input ready mode, is brought about in a process (1), (6), (11), (16), (21) or (26).

Now, the function of sending out the abbreviated dial number set in the above way will be described. In this case, the hook switch 103 is switched from the "on" state to the "off" state (corresponding to the telephone apparatus handset being switched from the "off-the-hook" state to the "on-the-hook" state) by the operator of the telephone apparatus. As a result, the controller 102 is set to the input ready mode E. When the "*" key is depressed in this mode, the mode is changed to a mode F1, which is the abbreviated address ready mode, in a process (34). Then, by keying in data "1" of the desired data "10", the mode is held in the abbreviated address mode F2 in a process (43). When the next data bit "0" of the desired "10" is keyed in, the address corresonding to the data "10" in the memory of the controller 102 is specified in a process (48), and the stored content "0425 83 1111" in this address is read out the mode is then switched to the mode F0. By switching the hook switch 103 from the "off" state to the "on" state at this time, a dial stop would be caused while causing a change of the mode to the initial setting ready mode A in a process (37), thus bringing an end to the function of sending out an abbreviated dial number.

If it is desired to send out successive abbreviated dial numbers after key operation for "10" as mentioned above succeeding data "*☐☐", "*ΔΔ", ..., may be keyed in consecutively by keying in each 2-digit data after operation of the "*" key (which is the special key), whereby the telephone addresses of the memory of the controller 102 are successively read out. Thus, the number of key operations compared to the prior art can be extremely reduced.

Now, a re-dial will be described. This function is to send out a previously dialed telephone number once again. In this case, the hook switch 103 is switched from the "on" state to the "off" state, thereby setting the controller 102 to the input ready mode E. By merely depressing the "#" key in this mode, a re-dial send-out is executed in a process (35), and when this send-out process is ended, the mode is changed to the mode F0.

A further function according to the invention is a function of sending out a signal (produced by operating the special key "*" or "#" key) not only as an instruction signal for manual dial setting but also as a manual dial signal itself to the repeater station.

By switching the hook switch 103 from the "on" state to the "off" state, the mode is switched to the input ready mode E to wait for data to be keyed in. Then, by depressing the "*" key the mode is switched to the mode F1 in a process (34). Then by depressing the "#" key a manual mode G is set in a process (45), and data subsequently keyed in is thus sent out as manual dial data. It will be seen from the Decision Table above that the manual mode G may be brought about by depressing the "*" key and then the "#" key in the abbreviation * mode F0 and abbreviated address ready mode F2 as well. The data keyed in by operating the "*" key and "#" key after the setting of the mode G, causes manual dial send-out to be executed in the processes (54) and (55) while a signal is sent out to the repeater station.

It is also to be noted that by switching the hook switch 103 from the "off" state to the "on" state, sending out a signal by dial operation is stopped, and the mode is changed to the setting ready mode A. Further, by operating the ten digit keys in the abbreviation * ready mode F0, the dial send-out function is executed in process (38). Further, by depressing the "#" key in the abbreviation address ready mode F2, the mode is switched to the abbreviation * ready mode F0 in a process (50).

While various functions have been brought about through special sequences as shown in the Decision Table above, this is by no means limitative, and it is possible to set different sequences as represented by a different decision table so that various functions may be brought about according to the state of the hook switch 103 and the sequence and number of times of operation of the ten digit keys and two special keys.

Further, while in the above embodiment the controller 102 shown in FIG. 1, which is constituted by an electronic calculator CPU, has been adapted to set a given sequence from the keyed-in code data and execute a corresponding function according to the set sequence to send out data to the repeater station, this is by no means limitative, and it is possible to let the control functions be undertaken by the repeater station in lieu of the CPU. In this case, the controller 102 in the circuit diagram of FIG. 1 may be omitted, and the multi-frequency signal sent out from the telephone network 105 through the terminal 107 may be coupled to a telephone exchange unit to decide a sequence determined by the sequence and number of times of key operation and provide a corresponding signal as a dial time signal to an outside central office.

What we claim is:

1. A telephone apparatus comprising:
    keyboard means having at least ten digit keys and at least two special keys for entering data to a telephone network;
    controller means for operating said apparatus in (a) a first manual dial setting mode which is responsive to all of said keys and allows transmission of said digit keys to said network, (b) a second manual dial setting mode which allows transmission of said digit keys and said special keys to said network, and (c) an abbreviated dial mode under the control of said two special keys which allows previously stored sequences to be recalled by entering a sequence including said special keys; and
    mode switching means including a variable-status hook switch for effecting the switching of said modes in said controller means in response to at least the status of said hook switch.

2. An apparatus as in claim 1 wherein:
    said controller means includes means for setting a plurality of abbreviated addresses, in response to operation of one of said special keys, and for storing a number in association with each said address such that operation of said one of said special keys followed by subsequent entry of said abbreviated address causes said stored number to be transmitted by said apparatus.

3. An apparatus as in claim 2 wherein:
said controller means further includes means for causing redial mode, during said abbreviated dial mode, of a number represented by a series of keys previously dialed during said normal dial mode, said redial mode being initiated in response to operation of at least one of said special keys.

4. A telephone apparatus comprising:
keyboard means havng at least ten digit keys and at least two special keys for entering data to a network;
controller means for: (1) operating said apparatus in a manual dial mode responsive to all of said keys, (2) operating said apparatus in an abbreviated dial mode under the control of said two special keys, (3) setting a plurality of abbreviated addresses in response to operation of one of said special keys, (4) storing a number in association with one of said addresses such that operation of said one of said special keys followed by subsequent entry of said one abbreviated address causes said stored number to be transmitted by said apparatus, and (5) causing automatic transmission by said apparatus, during said abbreviated dial mode, of successive stored numbers in response to successive operations of said one of said special keys, each operation followed respectively by entry of one of said abbreviated addresses.

5. A telephone apparatus comprising:
keyboard means having at least ten digit keys and at least two special keys for entering data to a telephone network;
controller means for selectively operating said apparatus in (a) a first manual dial mode which permits corresponding dial signals from any of said digit keys to be transmitted to said network, (b) a second manual dial mode which allows any of said keys to be transmitted to said network, and (c) an abbreviated dial mode which operates under the control of at least one of said two special keys, said abbreviated dial mode being entered from said first manual dial mode; and
mode switching means including a hook switch for effecting the selecting of said modes of said controller means based on the status of said hook switch and the sequence of operation of said two special keys.

6. An apparatus according to claim 5 wherein:
said special keys are labeled "*" and "#" key; and
said controller means includes: (1) means for setting a plurality of abbreviated addresses, while said hook switch is in a designated "on" status and in response to operation of any of said ten digit keys after said "*" key is operated, and for storing dial signal data to be transmitted in response to operation of any of said ten digit keys in association with one of said abbreviated addresses, and (2) means for transmitting said stored dial signal data, while said hook switch is in a designated "off" status, and upon operation of said "*" key followed by entry of said abbreviated address with operation of said digit keys.

7. A telephone apparatus comprising:

keyboard means for entering data to a network, having digit keys and special keys;
controller means for: (1) selectively operating said apparatus in a manual dial mode to permit corresponding dial signals from any of said keys to be transmitted, (2) operating said apparatus in an abbreviated dial mode under the control of at least one of said special keys;
mode switching means including a hook switch for effecting the selecting of said modes of said controller means based on the status of said hook switch and the sequence of operation of said two special keys;
said controller means including means for setting a plurality of abbreviated addresses, in response to operation of any of said ten digit keys after one of said special keys is operated, and for storing dial signal data to be transmitted in response to operation of any of said digit keys in association with one of said abbreviated addresses, and includes means for transmitting said stored dial signal data, while said hook switch is in a designated "off" status, upon operation of one of said special keys followed by entry of one of said abbreviated addresses with operation of said digit keys, and for causing, while said hook switch is in said designated "off" status, stored dial signal data associated with any selected one of said plurality of abbreviated addresses to be automatically successively transmitted in response to successive operations of one of said special keys, with each successive key operation followed by respective entry of one of said different abbreviated addresses.

8. An apparatus according to claim 7 wherein
said controller means further includes means for causing re-dialing, while said hook switch is in said designated "off" status, of a previously dialed number in response to operation of one of said special key.

9. A telephone apparatus, comprising:
a keyboard having at least ten digit keys and at least two special keys;
a dial sender for providing tone signals to a telephone network; and
controller means for operating either in (a) a manual dial mode during which said controller causes said dial sender to provide said tone signals on a one-to-one correspondence with actuation of any of said digit and special keys, or in (b) a abbreviated dial mode, during which said controller causes said dial sender to provide a sequence of said tone signals in response to actuation of at least one of said special keys.

10. A telephone apparatus as in claim 9, further comprising a hook switch, wherein the operable mode of said controller is determined in accordance with user-manipulation of said hook switch and actuation of said special keys.

11. A telephone apparatus comprising:
keyboard means containing digit keys and special keys for entering data;
dial sender for providing tone signals to a telephone network; and
a controller operable either in a manual dial mode, during which said controller causes said dial sender to provide said tone signals on a one-to-one correspondence with actuation of any of said digit and special keys, or in an abbreviated dial mode, during which said controller causes said dial sender to provide a sequence of said tone signals in response to actuation of at least one of said special keys;

a hook switch, wherein the operable mode of said controller is determined in accordance with user-manipulation of said hook switch and actuation of said special keys;

wherein said controller, while operable in said abbreviated mode, causes said dial sender to provide a plurality of said tone signal sequences respectively in response to plural actuation of one of said special keys, each such actuation being immediately followed by actuation of one of said digit keys to specify a particular tone signal sequence.

* * * * *